United States Patent [19]
Nygaard et al.

[11] 3,827,245
[45] Aug. 6, 1974

[54] RECOVERY AND PURIFICATION OF ETHYLENE FROM DIRECT HYDRATION ETHANOL VENT GAS STREAMS

[75] Inventors: Harold A. Nygaard, Lexington; Jacob N. Rubin, Newton Highlands, both of Mass.

[73] Assignee: Stone & Webster Engineering Corporation, Boston, Mass.

[22] Filed: Sept. 22, 1971

[21] Appl. No.: 182,713

[52] U.S. Cl............................ 62/18, 62/28, 62/40, 260/677 A
[51] Int. Cl............................................... F25j 3/02
[58] Field of Search............... 62/18, 23, 24, 27, 28, 62/40, 13, 14; 260/641, 643 R, 677 A

[56] References Cited
UNITED STATES PATENTS

| | | | |
|---|---|---|---|
| 2,270,852 | 1/1942 | Schuftan | 62/13 |
| 2,486,980 | 11/1949 | Robinson | 260/641 |
| 2,600,110 | 6/1952 | Hachmuth | 62/27 |
| 2,817,961 | 12/1957 | O'Connell | 62/23 |
| 2,823,523 | 2/1958 | Eakin | 62/28 |
| 3,073,129 | 1/1963 | Grenier | 62/28 |
| 3,187,064 | 6/1965 | Wang | 62/23 |
| 3,265,594 | 8/1966 | DeJean | 260/643 R |
| 3,292,380 | 12/1966 | Bucklin | 62/26 |
| 3,292,381 | 12/1966 | Bludworth | 62/26 |
| 3,444,696 | 5/1969 | Geddes | 62/28 |
| 3,675,435 | 7/1972 | Jackson | 62/23 |
| 3,733,368 | 5/1973 | Dodd et al. | 260/677 A |

FOREIGN PATENTS OR APPLICATIONS

| | | | |
|---|---|---|---|
| 816,231 | 1959 | Great Britain | 260/677 A |
| 791,220 | 2/1958 | Great Britain | 260/643 |

*Primary Examiner*—Norman Yudkoff

[57] ABSTRACT

Apparatus and process for recovering ethylene from the wet vent gas streams of catalytic ethylene hydration processes.

5 Claims, 1 Drawing Figure

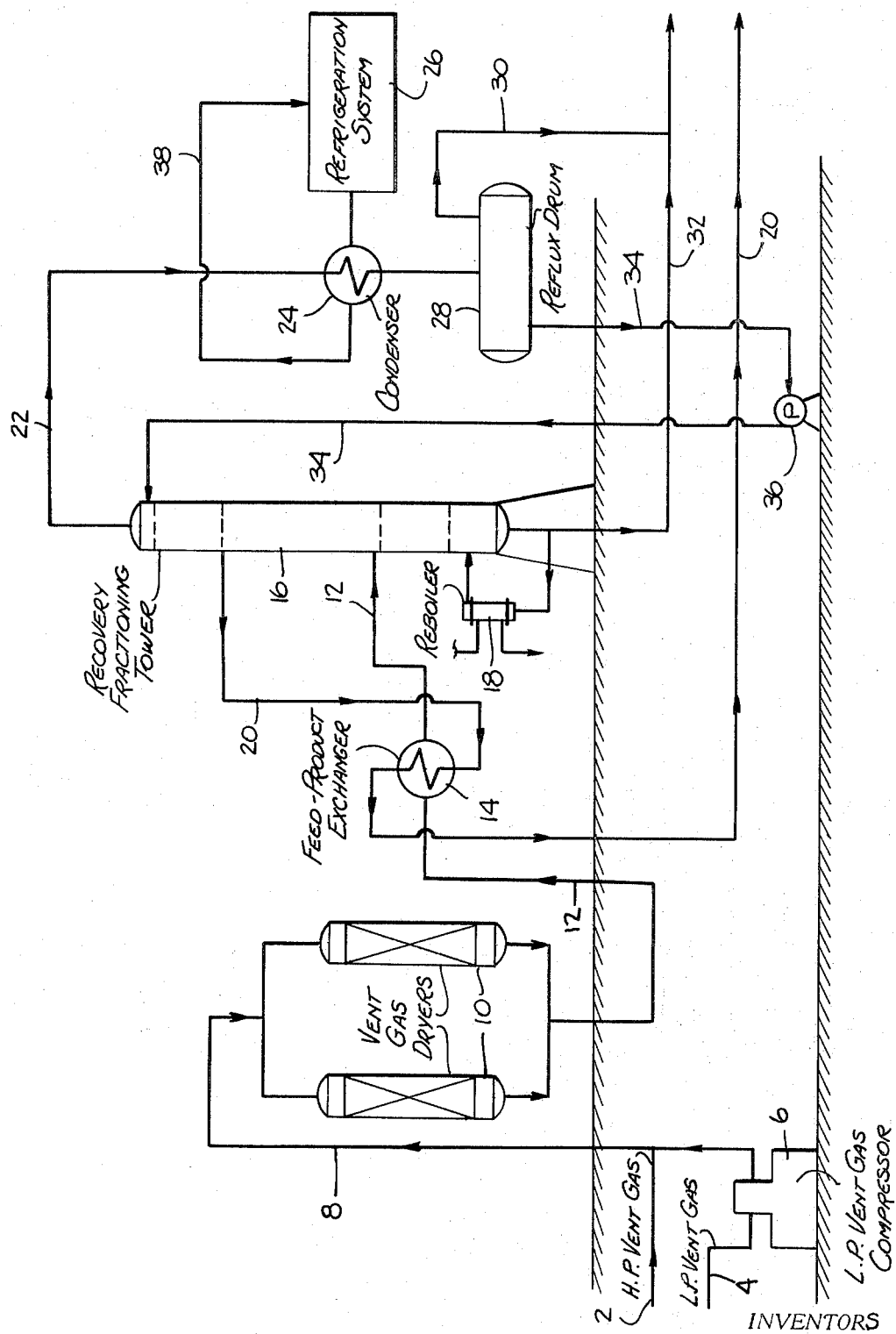

RECOVERY AND PURIFICATION OF ETHYLENE FROM DIRECT HYDRATION ETHANOL VENT GAS STREAMS

BACKGROUND OF THE INVENTION

1. Field of the Invention

The subject invention relates to an apparatus and method for recovering ethylene from wet vent gas streams. More particularly, the process and apparatus of the subject invention are directed to the recovery of ethylene from the vent gas produced in the production of ethanol (ethyl alcohol) from ethylene by catalytic hydration.

2. Description of the Prior Art

At present, the most commercially practicable method for producing ethanol is the catalytic ethylene hydration process. The catalytic ethylene hydration process is characterized by combining ethylene with water in the gaseous phase to form ethanol by contact with a catalyst which is frequently phosphoric acid at an elevated temperature and pressure.

The catalytic ethylene hydration process necessarily requires that the reactor effluent be cooled to form an acqueous alcohol solution, which solution must be withdrawn from the high-pressure circulating gas stream. It is also necessary that a purge stream be withdrawn from the high-pressure circulating gas to remove inerts introduced with the feed and to purge some of the undesirable by-products formed in the reaction. This purge stream is saturated with water and contains 85 to 95 percent ethylene and also a complex mixture of hydrocarbons and other organic chemical compounds. The impurities include methane, ethane, $C_4$'s, $C_6$'s and $C_8$'s, paraffinic and olefinic hydrocarbon isomers and organic oxygenated impurities such as diethyl ether and various alcohols and aldehydes in the $C_2$ through $C_8$ range. Thus, the purge stream is a source of ethylene which can be recovered.

In addition, a low-pressure vent gas stream is produced in catalytic hydration plants when the crude ethanol stream is depressured prior to delivery to the ethanol fractionation facilities. The low-pressure vent stream is made up of gases which were entrained and/or dissolved in the crude ethanol stream before it was depressured and is another source for recovery of ethylene.

At present, if an olefin manufacturing facility is in proximity to the catalytic ethylene hydration plant, both vent gas streams can be delivered to the olefin manufacturing facility for processing to recover ethylene. Both vent gas streams are generally introduced upstream of the cooling and drying equipment in the olefin manufacturing facility to remove moisture prior to refining the streams and recovering the ethylene in the distillation equipment. The disadvantage of this technique is that the olefin manufacturing facility must be provided with equipment larger than would normally be necessary since it must handle both the ethanol plant vent streams and the effluent from the olefin production furnaces. In particular, the process compressors, the cracked gas dryers with auxiliary regeneration equipment, the demethanizer, the de-ethanizer, the $C_2$ hydrogenation reactor with regeneration equipment, the ethylene/ethane splitter and both the ethylene and propylene refrigeration systems must be of increased size to handle the combined capacity of the vent stream and the olefin production furnaces.

With the tendency for the production of larger catalytic hydration ethanol plants, the vent gas streams which must be purified in the olefin manufacturing facility will continually increase and thereby magnify the need for larger olefin refining equipment.

Where olefin producing equipment is not accessible for use in recovering the ethylene from the ethanol plant vent streams, additional equipment is presently added. This additional equipment is comprised essentially of apparatus for depressurizing the high-pressure vent gas stream and compression equipment for increasing the pressure of the low-pressure vent gas stream so that both streams may be purified together in the same facility. Equipment for then cooling the combined stream is also provided. The cooling step chills the stream and reduces the water content thereof at the same time condensing some of the less volatile constituents of the gas stream. The gases remaining are then dehydrated in dryers, possibly cooled further, and finally distilled to recover the ethylene in the stream.

However, this design has two major disadvantages. First, a significant ethylene loss occurs in the separator vessels due to dissolved and/or entrained ethylene. Secondly, solid compounds in the form of hydrates tend to form in the cold equipment following the dryers if the operating conditions are upset and the temperature of the gases and liquids is reduced too much. Such hydrates plug the equipment and impair or even prevent the operation of the equipment.

SUMMARY OF THE INVENTION

The present invention is directed to providing apparatus and a process for recovering ethylene from the vent streams of catalytic ethylene hydration systems without the disadvantages of losing ethylene in condensed fluid and possibly forming hydrates during the recovery process.

The apparatus provided in the present invention includes vent gas dryers, a recovery fractionating tower, a heat exchanger for heating the recovered ethylene and cooling the stream entering the recovery fractionation tower and apparatus for at least partly condensing the overhead leaving the recovery fractionation tower to prevent an excessive amount of ethylene from escaping in the tower overhead.

Initially, the low-pressure vent stream is compressed to a pressure substantially the same as that to which the highpressure vent stream is reduced and the highpressure and lowpressure vent streams are delivered to a common line. From the common line the combined stream is passed through conventional vent gas dryers. The dry gas leaving the conventional vent gas dryers is passed in heat exchange relationship with ethylene product stream from the recovery fractionation tower and delivered directly to said tower. The ethylene product is recovered as a side stream from the recovery fractionation tower and after passing in heat exchange relationship with the stream being delivered to the recovery fractionation tower is sent on to the ethylene product line. The tower bottoms from the recovery fractionation tower are delivered to the fuel line. The tower overhead which contains methane gas and a moderate percentage of ethylene is passed through a condenser to be cooled wherein most of the ethylene in the stream condenses to a liquid. The vapor-liquid mixture then flows to a reflux drum. The methane with a small amount Of uncondensed ethylene is delivered to the fuel line with the tower bottoms. The liquid in the reflux drum is pumped to the recovery fractionation tower as reflux.

DESCRIPTION OF THE DRAWINGS

The drawing is a schematic diagram of the apparatus and process of the ethylene recovery system of the present invention.

DESCRIPTION OF THE PREFERRED EMBODIMENT

The apparatus and process of the present invention are directed to recovering ethylene from wet ethylene-containing vent gases and are particularly suited for recovering ethylene from the vent streams of an ethanol plant, employing a catalytic ethylene hydration process.

The apparatus of the present invention includes essentially a low-pressure vent gas compressor 6, vent gas dryers 10, a feed-product heat exchanger 14, a recovery fractionating tower 16, a reboiler 18, a condenser 24, a refrigeration system 26 for the condenser 24 and a reflux drum 28.

The low-pressure vent gas compressor 6 is a conventional compressor and is used to elevate the pressure of the low-pressure vent stream to the pressure to which the high-pressure stream has been reduced to afford simultaneous processing of both streams. A common line 8 is provided for both streams after the low-pressure vent gas has been elevated to a pressure equal to the pressure of the high-pressure vent line.

The vent gas dryers 10 are conventional and are provided with typical desiccant material such as molecular sieves, activated alumina and activated bauxite.

The feed-product heat exchanger 14 is designed to allow ethylene product leaving the tower 16 to pass on the cold side and the relatively dry vent gas from the vent gas dryers 10 to pass on the hot side. If desired, the stream flowing to the tower 16 may be further cooled using, for example, propane refrigeration.

The recovery fractionation tower 16 is of conventional design and includes a reboiler 18 and provision for removal of purified ethylene as a side cut. In practice, low-pressure stream has been found to be the most desirable source of heat for the reboiler 18.

The condenser 24, the refrigeration system 26 associated with the condenser 24 and the reflux drum 28 are provided to remove most of the ethylene from the tower overhead emanating from the recovery fractionation tower 16. The condenser 24 is designed for passage of the tower overhead through the hot side and passage of the coolant from the refrigeration system 26 through the cold side. Practice shows that a suitable coolant for use in the condenser is propane which can be recycled through the condenser 24 and the refrigeration system 26 in a closed circuit through line 38.

System lines are also provided for the flow of fluids. Gas line 12 conveys the relatively dry gas from the vent gas dryers 10 through the feed-product heat exchanger 14 to the recovery fractionation tower 16. Ethylene line 20 conveys ethylene withdrawn as a side stream from the recovery fractionation tower 16 through the heat exchanger 14 and out of the system. Gas line 22 delivery the overhead from the recovery fractionation tower 16 to condenser 24. The fuel line 32 delivers the tower bottoms from the fractionation tower 16 to the main fuel system and a gas line 30 is provided to also deliver the gas from the reflux drum 28 to the fuel line 32. A liquid line 34 and pump 36 are provided to deliver the liquid from the reflux drum 28 back to the recovery fractionation tower 16. If desired, a heater may be installed in line 32 to vaporize any liquid flowing therein.

The subject invention is exemplified by the following detailed illustration. The process of the subject invention is initiated by delivering low-pressure vent gas released from the crude ethanol stream of the ethanol plant through line 4 to the compressor 6. The vent stream leaving the low-pressure vent compressor 6 has been elevated to a pressure of approximately 350 PSIG and is delivered to line 8. High-pressure vent gas withdrawn from the enthanol reactor high-pressure circulating gas stream is reduced in pressure and transported through line 2 to the common vent line 8. The combined vent streams are delivered to conventional vent gas dryers 10 wherein considerable moisture is removed. At least 99 percent of the moisture is removed from the streams in the conventional vent gas dryers 10. The relatively dry vent gas is then transported through line 12 to the hot side of the feed-product heat exchanger 14. Therein the gas is cooled to approximately −12°F. and conveyed through line 12 to the recovery fractionation tower 16.

The recovery fractionation tower 16 is operated at 290 PSIG and a temperature which ranges from −19°F. at the top to 260°F. at the bottom.

Ethylene of at least 99 percent concentration and amounting to approximately 97 per cent or more of the ethylene in the feed to the system is taken from the recovery fractionation tower 16 as a side cut at approximately −17°F. and delivered through line 20 to the cold side of the feed-product heat exchanger 14 and ultimately to the ethylene product line. The tower overhead is taken through line 22 and consists principally of methane gas with some ethylene. The overhead is at a temperature of approximately −19°F. when it leaves the fractionation recovery tower 16. Tower bottoms are taken as fuel through line 32 and a portion of the tower bottoms is recycled through a reboiler 18 to provide heat to the recovery fractionation tower 16. In practice it has been found that low-pressure steam should be used to heat the tower bottoms passing through the reboiler 18. The temperature of the bottoms being returned to the recovery fractionation tower 16 is approximately 260°F.

The tower overhead is conveyed through line 22 to the condenser 24 wherein the gas is cooled to approximately −22°F. under a pressure of about 290 PSIG and part of it containing most of the ethylene is condensed. The cooled mixture from the condenser 24 is delivered to a reflux drum wherein the liquid and remaining gas are separated. The gas which is principally methane is conveyed from the reflux drum 28 through line 30 to the fuel line 32. The liquid which is principally ethylene is pumped by pump 36 through line 34 to the top of the recovery fractionation tower 16. The condenser 24 is cooled by liquid propane at a temperature of −30°F.

We claim:

1. A process for recovery of ethylene from vent gases obtained as a by-product of a catalytic ethylene hydration process and having ethylene present therein as a major component thereof, which process comprises:

passing the vent gases obtained from the ethylene hydration process to a drying zone drying said vent gas in said drying zone to remove substantially all of the moisture present therefrom cooling the dried vent gas passing the cooled dried vent gas to a fractionation zone fractionating all of the dry cooled vent gas to produce an ethylene fraction passing the ethylene fraction taken as a side cut from said fractionation zone in heat exchange relationship with the vent gases to cool same and thereafter passing said ethylene fraction to an ethylene product line.

2. A process as in claim 1 further comprising the step of removing overhead from the recovery tower and condensing most of the ethylene therefrom and returning the condensed ethylene to the fractionation tower.

3. A process for recovery of ethylene from vent gases obtained as a by-product of a catalytic ethylene hydration process and having ethylene present therein as a major component, which process comprises:

collecting high pressure vent gas containing about 85 percent to 95 percent ethylene and reducing the pressure thereof collecting low pressure vent gas containing a major amount of ethylene therein and elevating the pressure thereof to the value at which the high pressure vent gas has been reduced combining the two vent gases with one another passing the combined vent gases so obtained from the ethylene hydration process to a drying zone drying said combined vent gas in said drying zone to remove substantially all of the moisture present therefrom cooling the dried vent gas passing the cooled dried vent gas to a fractionation zone fractionating all of the dry cooled vent gas to produce an ethylene fraction passing the ethylene taken as a side cut from said fractionation zone in heat exchange relationship with the vent gases to cool same and thereafter passing said ethylene fraction to an ethylene product line.

4. A process as in claim 3 wherein the reduced pressure of the high-pressure vent gas is 350 PSIG, the pressure of the low-pressure vent gas is 350 PSIG subsequent to pressurization; the pressure in the fractionation recovery tower is 290 PSIG and the temperature gradient in the fractionation tower is from 260°F. to −19°F. and the ethylene is removed from the fractionation recovery tower as a side cut at a temperature of −17°F.

5. A process as in claim 4 wherein the ethylene-rich liquid which is condensed from the fractionation tower overhead is condensed at a temperature of −20°F. and a pressure of 290 PSIG.

* * * * *